Patented Nov. 24, 1942

2,302,823

UNITED STATES PATENT OFFICE 2,302,823

DYESTUFFS OF THE ANTHRAQUINONE SERIES

Myron S. Whelen, Riverside Gardens, Del., assignor to E. I. du Pont de Nemours & Company, Wilmington, Del., a corporation of Delaware No Drawing. Application October 14, 1939, Serial No. 299,465

4 Claims. (Cl. 260—374)

This invention relates to the preparation of wool dye-stuffs of the anthraquinone series. The invention has for its object the preparation of blue to green dyestuffs of the arylaminoanthraquinone sulfonic acid class which will dye in level shades and which exhibit in general the good fastness properties of the known dyes of this series.

1 - alkylamino-4-arylaminoanthraquinone sulfonic acids are a well known class of dyestuffs which dye wool and silk in blue to green shades. Due to their solubility and affinity for animal fibers these colors in general dye unevenly unless extreme care is employed in their application. Various attempts have been made to alter the chemical constitution and therefore the dyeing properties of these colors by adding substituents in the aryl ring. In the main, however, these new aryl substituted derivatives dye in shades quite different from the original dyestuffs and cannot therefore be employed as substitutes although they may exhibit improved level dyeing properties.

I have found that blue to green dyestuffs of this class which exhibit good level dyeing properties can be produced by substituting for the secondary alkylamino group in the 1-alkylamino-4-arylaminoanthraquinone sulfonic acids a tertiary alkylamino group. These new 1-dialkylamino-4-arylaminoanthraquinones which carry sulfonic acid groups in the aryl ring dye in shades similar to the monoalkylamino compounds. While they are slightly greener in shade than the monoalkyl derivatives the change is not so marked but that they can be used for the same purposes with a minimum amount of a shading color. However, the fact that the dialkylamino derivatives dye in somewhat greener shades than the monoalkyl derivatives gives them greater utility because they can be shaded towards the red while the reddish-blue monoalkyl derivatives cannot be shaded back to the more greenish-blue and still retain the brightness, tinctorial strength and fastness required of these types of dyes because yellow dyes of similar fastness and dyeing properties are not available.

These 1-dimethylamino-4-arylaminoanthraquinone sulfonic acid compounds may be prepared by reacting 1-nitroanthraquinone with dimethylamine, brominating the resulting 1-dimethylamino-anthraquinone to give the corresponding 4-bromo derivative and condensing the 1-dimethylamino-4-bromoanthraquinone with the desired arylamine. On sulfonating the base at ordinary room temperatures with oleum, sulfonation is effected in the aryl ring.

The dimethylaminoanthraquinone may be prepared by any of the known methods (see British Patent 22,128 of 1901), and the gromination may be effected by the addition of four atoms of bromine per mole of dimethylaminoanthraquinone to a dilute aqueous hydrochloric acid solution of the dimethylaminoanthraquinone, followed by treatment with dilute ammonia solution. The arylamine which is used to replace the bromine in the 4-position may be any one of the class usually employed in preparing the known 1-amino or 1-arylamino-4-arylaminoanthraquinone acid wool dyes. By employing substituted arylamines a variety of colors may be obtained which vary widely in shade within the blue to green range but which exhibit improved level dyeing properties.

The following examples are given to illustrate the invention more fully. The parts used are by weight.

Example 1

Fifty (50) parts of 1-dimethylamino-4-p-toluidinoanthraquinone (prepared by the condensation of 1-dimethylamino-4-bromoanthraquinone with para-toluidine) are dissolved in three hundred (300) parts of concentrated sulfuric acid (monohydrate) at a temperature of 15–25° C. Then at 15–25° C., thirty (30) parts of 65% oleum are added at room temperature for two hours at the end of which time sulfonation is complete. (In the event that sulfonation is not complete a further small addition of 65% oleum is added, followed by stirring for several hours.) On completion of the sulfonation, the sulfonation mass is drowned in a mixture of 3,000 parts ice and water, and the insoluble sulphonic acid is filtered off, washed slightly with cold water, and then dissolved in 4,000 grams of water by heating to 95° C. The solution is then made slightly alkaline with sodium hydroxide, filtered, and the filtrate salted to a concentration of 3% sodium chloride. The precipitated dyestuff in the form of the sodium salt is removed by filtration from the cooled solution as shiny bronze needles possessing a very high degree of purity. It dyes wool in level blue shades of excellent strength and brightness.

*Example 2*

Ten (10) parts of 1-dimethylamino-4-anilino-anthraquinone, (prepared by the condensation of 1 - dimethylamino - 4 - bromoanthraquinone with aniline) are dissolved in sixty (60) parts of monohydrate at 15–25° C. and thereto are added six (6) parts of 65% oleum at 20–25° C. over one-half hour. After stirring two hours the sulfonation is complete. The sulfonation mass is then poured into a mixture of 600 parts ice and water, the insoluble dyestuff is filtered off, taken up in water which is then made alkaline and salted to a concentration of 3% sodium chloride. The dyestuff is filtered off cold in the form of bronzy crystals. It is soluble in water, and dyes wool in level blue shades from an acid bath.

*Example 3*

Seven (7) parts of 1-dimethylamino-4-para-chloro-anilino-anthraquinone are dissolved in seventy (70) parts of sulfuric acid mono-hydrate at 20–25° C. There are then added at 20° C. over a period of fifteen minutes eight (8) parts of 65% oleum. After stirring for two hours at room temperature sulfonation is complete. The dyestuff is isolated in a manner described in Example 1, and is obtained as shiny bronzy crystals. It dyes wool evenly in bright greenish-blue shades.

It is of course understood that the potassium salts of the sulfonic acids may be produced by substituting the corresponding potassium salt for the sodium salts used in the above examples.

In addition to the above examples, wool dyestuffs varying in shade from blue to green may be prepared by sulphonating the following bases in a manner illustrated above.

| | |
|---|---|
| 1 - dimethylamino-4-o-anisidino-anthraquinone | Greenish-blue. |
| 1-dimethylamino-4-(p-phenylanilino)-anthraquinone | do. |
| 1-dimethylamino - 4 - (4'-phenylamino)-anilino-anthraquinone | Green. |
| 1-dimethylamino-4-(4'-hydroxyanilino)-anthraquinone | Greenish-blue. |
| 1-dimethylamino-4-(4'-dimethylamino-anilino)-anthraquinone | Green. |
| 1 - dimethylamino-4-o-phenetidino-anthraquinone | Greenish-blue. |

As illustrated above the products may be isolated in the form of the free sulfonic acids or in the form of their alkali metal salts.

I claim:

1. Compounds of the class consisting of 1-dimethylamino-4-arylaminoanthraquinone sulfonic acids in which the aryl group is of the benzene series and which carry the sulfonic acid group in the aryl ring, and their alkali metal salts.

2. Compounds of the class consisting of 1-dimethylamino-4-p-toluidino - anthraquinone sulfonic acid, which carries the sulfonic acid group in the toluene ring, and its alkali metal salts.

3. Compounds of the class consisting of 1-dimethylamino-4-anilino - anthraquinone sulfonic acid, which carries the sulfonic acid group in the anilino ring, and its alkali metal salts.

4. Compounds of the class consisting of 1-dimethylamino - 4 - p-chloroanilino-anthraquinone sulfonic acid, which carries the sulfonic acid group in the anilino ring, and its alkali metal salts.

MYRON S. WHELEN.